(12) United States Patent
Kitamura et al.

(10) Patent No.: US 11,748,956 B2
(45) Date of Patent: Sep. 5, 2023

(54) DEVICE AND METHOD FOR FOVEATED RENDERING

(71) Applicant: Synaptics Incorporated, San Jose, CA (US)

(72) Inventors: Kota Kitamura, Tokyo (JP); Goro Sakamaki, Tokyo (JP); Tomoo Minaki, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 175 days.

(21) Appl. No.: 17/500,281

(22) Filed: Oct. 13, 2021

(65) Prior Publication Data

US 2023/0111826 A1    Apr. 13, 2023

(51) Int. Cl.
| | |
|---|---|
| *G06T 19/00* | (2011.01) |
| *G06T 15/50* | (2011.01) |
| *G06T 3/40* | (2006.01) |
| *G06T 7/90* | (2017.01) |
| *G06T 3/00* | (2006.01) |
| *G06T 15/00* | (2011.01) |

(52) U.S. Cl.
CPC .......... *G06T 19/006* (2013.01); *G06T 3/0056* (2013.01); *G06T 3/4053* (2013.01); *G06T 7/90* (2017.01); *G06T 15/005* (2013.01); *G06T 15/503* (2013.01)

(58) Field of Classification Search
None
See application file for complete search history.

(56) References Cited

U.S. PATENT DOCUMENTS

| 10,665,209 B2 | 5/2020 | Morein |
| 2019/0026864 A1* | 1/2019 | Chen ..................... G06T 3/4053 |

* cited by examiner

*Primary Examiner* — Robert J Craddock
(74) *Attorney, Agent, or Firm* — Paradice & Li LLP

(57) ABSTRACT

A display driver includes interface circuitry, image processing circuitry, and drive circuitry. The interface circuitry is configured to receive a full frame image and a foveal image from a source external to the display driver. The image processing circuitry is configured to: upscale the full frame image; render a foveated image from the upscaled full frame image and the foveal image. The foveated image includes a foveal area based on the foveal image, a peripheral are based on the upscaled full frame image, and a border area based on the foveal image and the upscaled full frame image. The border area being located between the foveal area and the peripheral area. The drive circuitry is configured to drive a display panel using the foveated image.

20 Claims, 18 Drawing Sheets

FIG. 6

| VS | VBP | | | |
|---|---|---|---|---|
| HS | ⋮ | | | |
| HS | ⋮ | | | |
| HS | ⋮ | | | |
| HS | VBP | | | |
| HS | HBP | Foveal Image #1 | | HFP |
| HS | HBP | Foveal Image #2 | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | ⋮ | | HFP |
| HS | HBP | Foveal Image #M-1 | | HFP |
| HS | HBP | Foveal Image #M | | HFP |
| HS | HBP | Control Data | Full Frame Image #1 | HFP |
| HS | HBP | | Full Frame Image #2 | HFP |
| HS | HBP | | ⋮ | HFP |
| HS | HBP | | ⋮ | HFP |
| HS | HBP | | ⋮ | HFP |
| HS | HBP | | ⋮ | HFP |
| HS | HBP | | ⋮ | HFP |
| HS | HBP | | ⋮ | HFP |
| HS | HBP | Full Frame Image #M-1 | | HFP |
| HS | HBP | Full Frame Image #M | | HFP |
| HS | VFP | | | |
| HS | ⋮ | | | |
| HS | VFP | | | |

F I G. 14
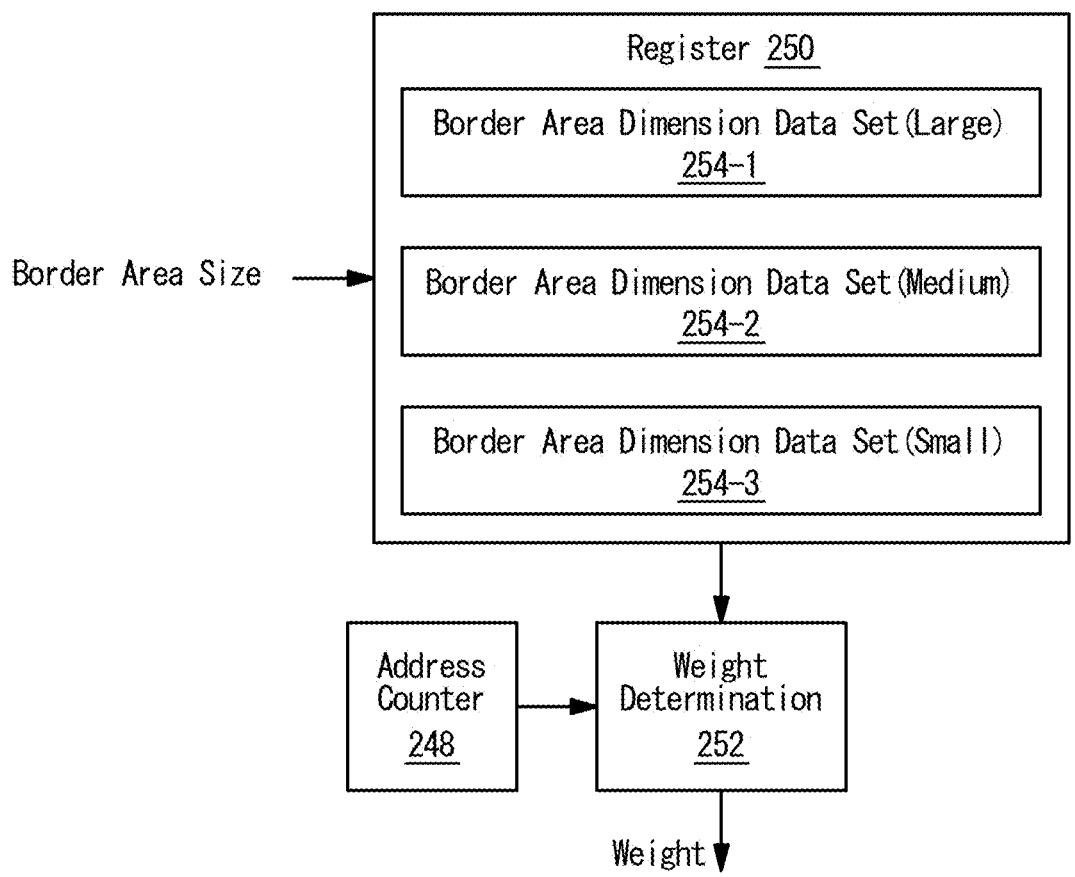

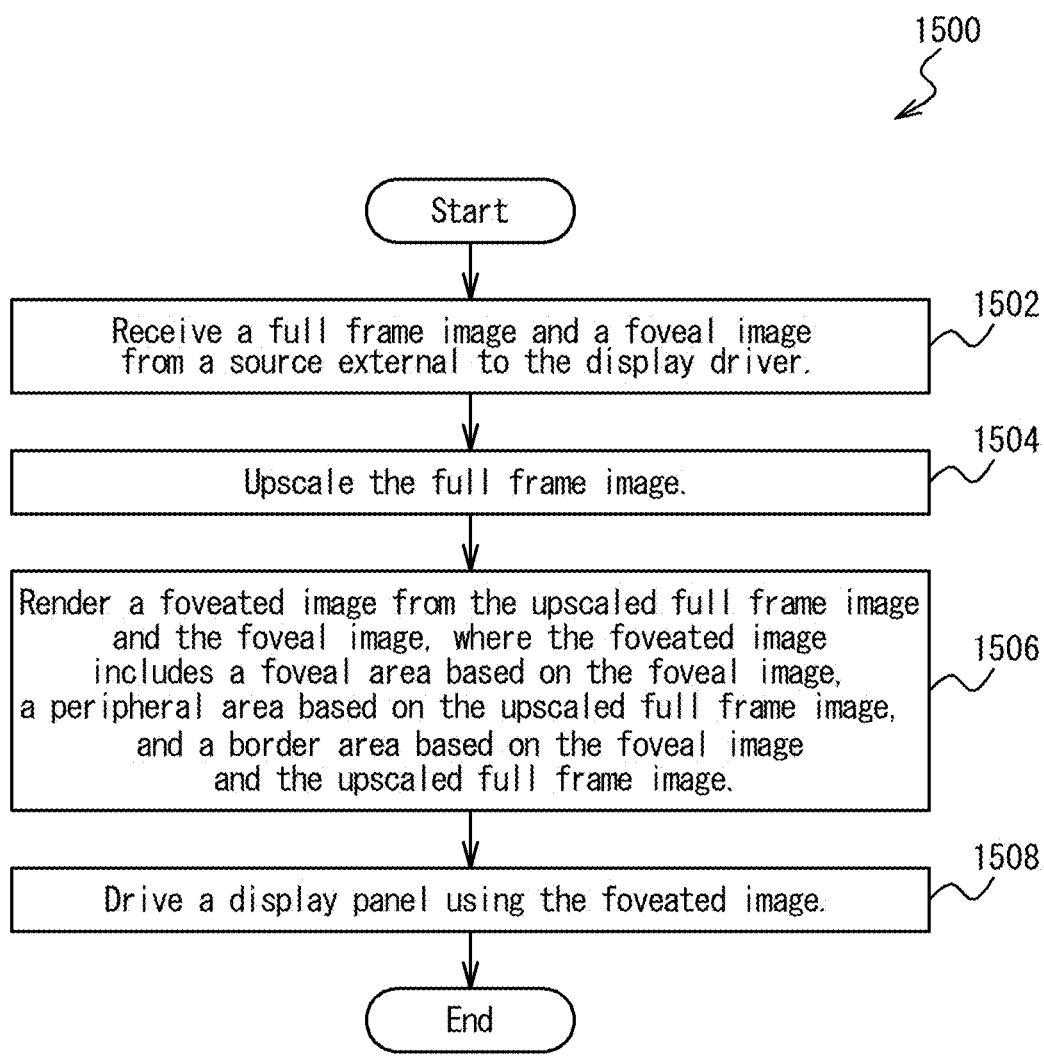

DEVICE AND METHOD FOR FOVEATED RENDERING

TECHNICAL FIELD

The disclosed technology generally relates to devices and methods for foveated rendering.

BACKGROUND OF RELATED ART

Head-mounted display (HMD) devices are configured to be worn on, or otherwise affixed to, a user's head. An HMD device may include one or more displays positioned in front of one, or both, of the user's eyes. More specifically, the HMD device is configured to display images or video in close proximity to the user's eyes to provide an immersive experience for the user of the HMD device. As such, HMD devices are well-suited for extended reality (XR) applications (including virtual reality (VR), augmented reality (AR), and merged reality (MR), among other examples). However, due to the close proximity of the displays to the user's eyes, only a relatively small portion of the displayed images reaches the user's fovea. In other words, the user's eyes can only focus on a relatively small region of each display at any given time.

Foveated rendering is a display technology often associated with HMD devices. More specifically, foveated rendering can reduce the processing overhead of HMD devices by dynamically rendering different regions of an image at different resolutions (also referred to as a "foveated image"). For example, a foveated image may include a foveal region and a peripheral region. The foveal region is aligned with the user's fovea and therefore represents the region of the image that can be perceived with the highest visual acuity. In contrast, the peripheral region is the region surrounding the foveal region and therefore falls within the user's peripheral vision. Foveated rendering may simulate human visual perception, for example, by rendering the peripheral region at a lower resolution (or reduced fineness) than the foveal region.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

In some embodiments, a display driver includes interface circuitry, image processing circuitry, and drive circuitry. The interface circuitry is configured to receive a full frame image and a foveal image from a source external to the display driver. The image processing circuitry is configured to upscale the full frame image and render a foveated image from the upscaled full frame image and the foveal image. The foveated image includes a foveal area based on the foveal image, a peripheral area based on the upscaled full frame image, and a border area based on the foveal image and the upscaled full frame image. The border area is located between the foveal area and the peripheral area. The drive circuitry is configured to drive a display panel using the foveated image.

In some embodiments, a display system includes a source, a display panel, and a display driver. The source is configured to render a full frame image and a foveal image. The display driver is configured to receive the full frame image and the foveal image from the source. The display driver is further configured to upscale the full frame image and render a foveated image from the upscaled full frame image and the foveal image. The foveated image includes a foveal area based on the foveal image, a peripheral area based on the upscaled full frame image, and a border area based on the foveal image and the upscaled full frame image. The border area is located between the foveal area and the peripheral area. The display driver is further configured to drive the display panel using the foveated image.

In some embodiments, a method of operating a display driver is provided. The method includes receiving a full frame image and a foveal image from a source external to the display driver. The method further includes upscaling the full frame image. The method further includes rendering a foveated image from the upscaled full frame image and the foveal image. The foveated image includes a foveal area based on the foveal image, a peripheral area based on the upscaled full frame image, and a border area based on the foveal image and the upscaled full frame image. The border area is located between the foveal area and the peripheral area. The method further includes driving a display panel using the foveated image.

BRIEF DESCRIPTION OF THE DRAWINGS

The present embodiments are illustrated by way of example and are not intended to be limited by the figures of the accompanying drawings.

FIG. 6 illustrates an example data format of image data transmitted from a controller to a display driver during one frame period, according to one or more embodiments.

FIG. 14 illustrates an example configuration of a register, according to one or more embodiments.

FIG. 15 is an illustrative flowchart depicting an example method of operating a display driver, according to one or more embodiments.

Figure 1:
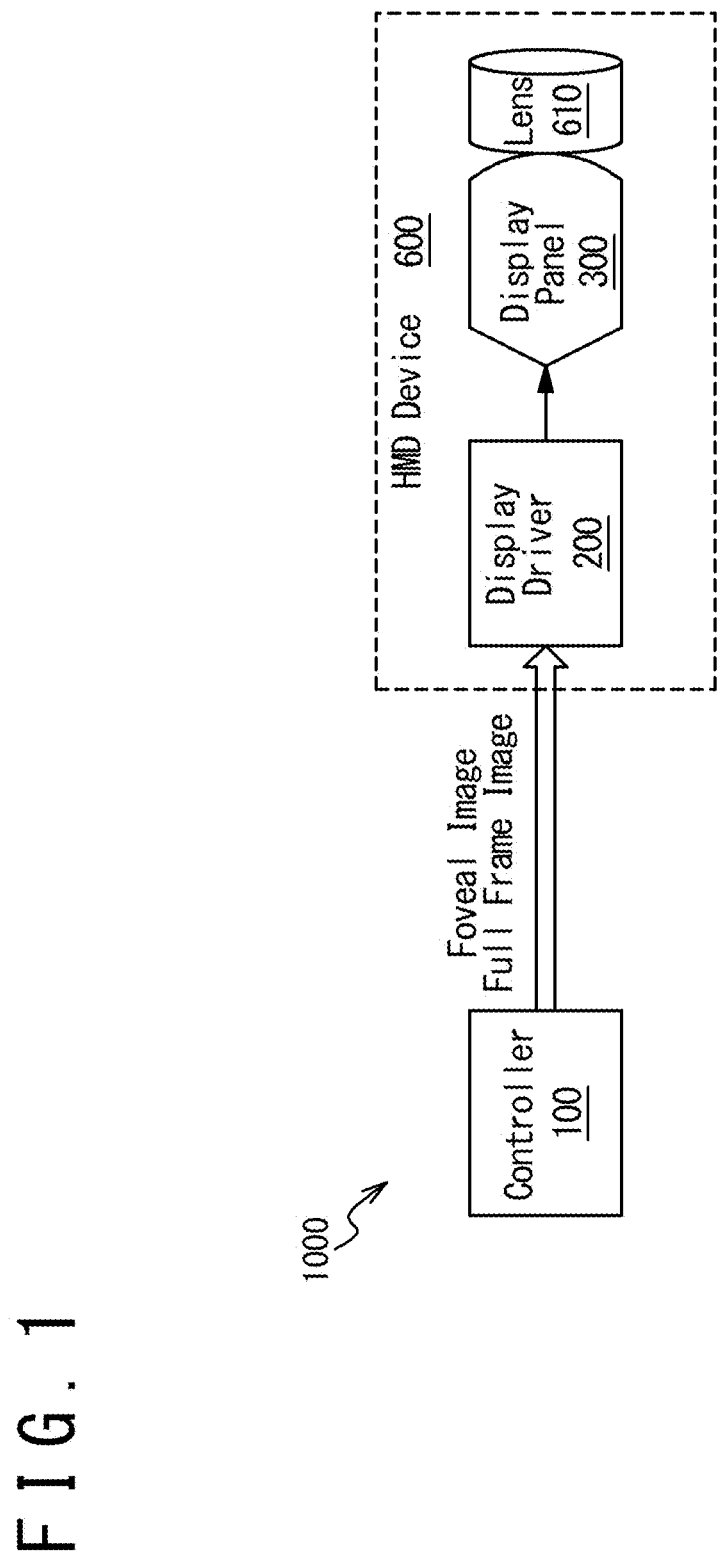
FIG. 1 illustrates an example configuration of a display system adapted to foveated rendering, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description. The term "coupled" as used herein means connected directly to or connected through one or more intervening components or circuits.

Foveated rendering is a display technology often used to reduce the processing overhead of HMD devices by dynamically rendering different regions of an image at different resolutions (also referred to as a "foveated image"). More specifically, foveated rendering may simulate human visual perception by rendering a peripheral region of the image at a lower resolution (or reduced fineness) than a foveal region of the image. For example, the foveal region may be aligned with the user's fovea whereas the peripheral region may fall within the user's peripheral vision.

A foveated image can be generated by merging or overlaying a foveal image with a full frame image. The foveal image may be displayed or rendered within the foveal region of the foveated image and the full frame image may be displayed or rendered within the peripheral region of the foveated image. Similar to human visual perception, the foveal image may include more visual information (or details) per unit area than the full frame image. The placement or position of the foveal image relative to the full frame image may be determined based on the gaze direction of the user, which may be detected through eye tracking.

An HMD system may include a display driver (e.g., a display driver integrated circuit (DDIC)) configured to drive a display panel to display or render foveated images. More specifically, the display driver may be configured to merge a foveal image with a full frame image to render a foveated image. In some implementations, the display driver may be configured to receive the foveal image and the full frame image from a source via a communication link.

The communication link between the display device and the source may be limited in bandwidth. To achieve high latency throughput with such limited bandwidth, the source may transmit the full frame image to the display driver in its native resolution (which may be lower than the resolution of the display). The display driver may be configured to upscale the full frame image and merge the foveal image with the upscaled full frame image for display.

The differences in resolution between the full frame image and the foveal image may result in an "unsmoothed" boundary at the edges of the foveal region of the foveated image. More specifically, the transition from the foveal region to the peripheral region may appear stark or jarring due to the change in resolution. The present disclosure provides efficient schemes to smooth the boundary of the foveal image in the foveated image.

In one or more embodiments, a display driver includes interface circuitry, image processing circuitry, and drive circuitry. The interface circuitry is configured to receive a full frame image and a foveal image from a source external to the display driver. The image processing circuitry is configured to: upscale the full frame image; render a peripheral area of a foveated image based on the upscaled full frame image; render a foveal area of the foveated image based on the foveal image, the foveal area being framed by the peripheral area; and render a border area of the foveated image based on a first portion of the foveal image with a second portion of the upscaled full frame image, the border area being located between the foveal area and the peripheral area. The drive circuitry is configured to drive a display panel based on the foveated image.

FIG. 1 illustrates an example configuration of a display system 1000 adapted to foveated rendering, according to one or more embodiments. In the illustrated embodiment, the display system 1000 includes a controller 100 and an HMD device 600. The HMD device 600 includes a display driver 200 and a display panel 300. The display panel 300 may be a liquid crystal display (LCD) panel, an organic light emitting diode (OLED) display panel, or a display panel implementing various other suitable display technologies. The HMD device 600 further includes a lens 610 disposed in front of the display panel 300. A user of the HMD device 600 looks through the lens 610 to view the image displayed on the display panel 300.

The controller 100 is configured as a source configured to provide a foveal image and a full frame image to the display driver 200. The foveal image may correspond to a foveal region of a foveated image that is aligned with the user's fovea (e.g., the region of the image on which the user's eyes are focused), and the full frame image may correspond to a peripheral region of the foveated image that falls within the user's peripheral vision. In some embodiments, the full frame image may have the same native resolution as the foveal image but encompass a larger display area than the foveal image. In other embodiments, the full frame image may have a different native resolution than the foveal image. The display driver 200 is configured to render a foveated image based on the foveal image and the full frame image and drive the display panel 300 based on the foveated image.

Figure 2:
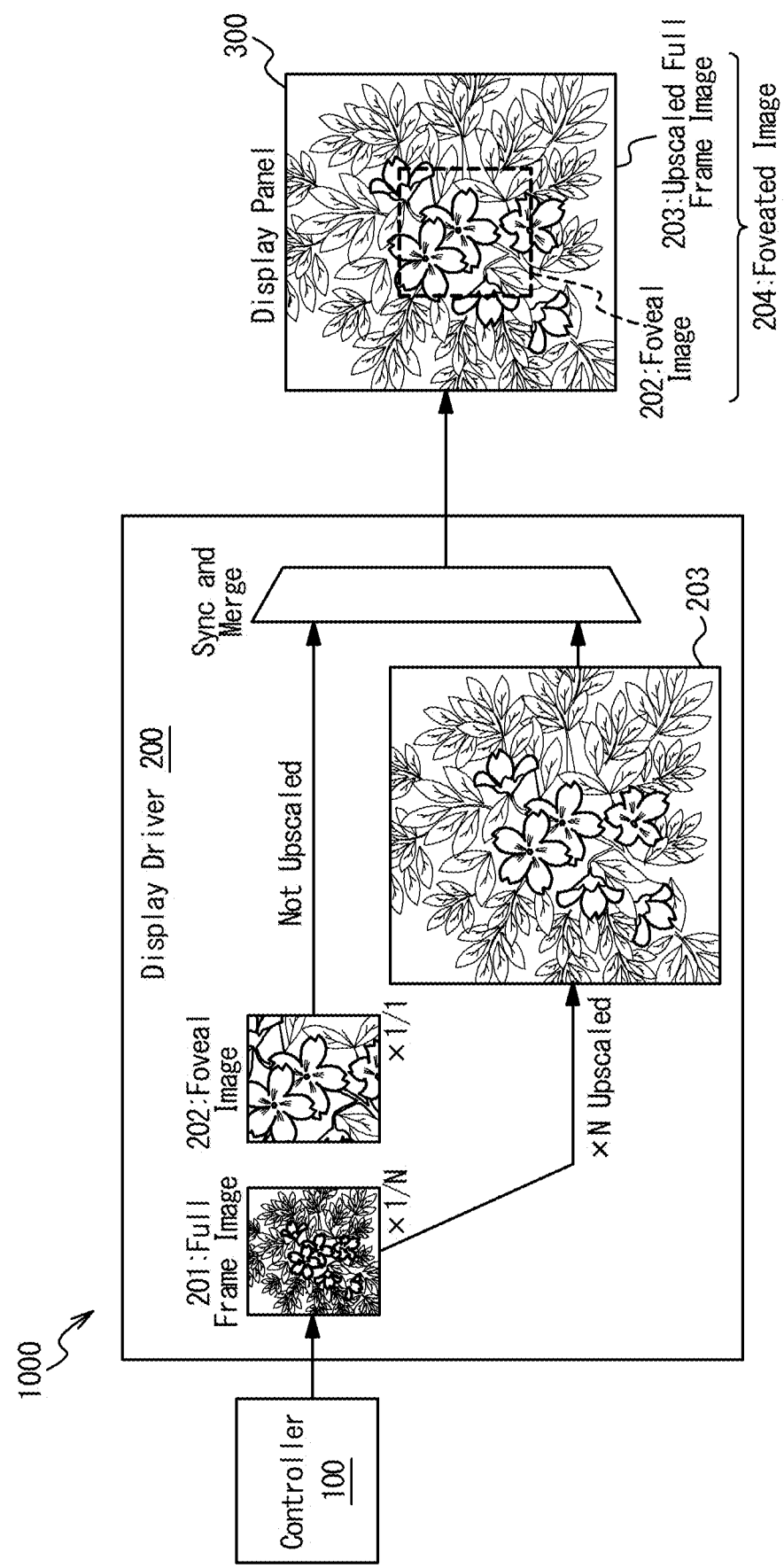
FIG. 2 illustrates an example operation of a display driver, according to one or more embodiments.

FIG. 2 illustrates an example operation of the display driver 200, according to one or more embodiments. In some embodiments, the display driver 200 is configured to receive a full frame image 201 and a foveal image 202 from the controller 100. The display driver 200 is further configured to configured to upscale the full frame image 201 received from the controller 100 and merge the foveal image 202 with the upscaled full frame image, denoted by numeral 203, to generate a foveated image 204 in which the foveal image 202 is overlayed upon the upscaled full frame image 203. The display driver 200 is further configured to drive or render the foveated image 204 on the display panel 300. In some implementations, the display driver 200 may directly display the foveated image 204 on the display panel 300. In other implementations, the display driver 200 may further perform image processing on the foveated image 204 prior to displaying the image on the display panel 300. In some implementations, the full frame image 201 may be upscaled by a factor of N, where N is an integer value greater than one. In some implementations, the foveal image 202 has the same number of pixels as the original full frame image 201, whereas the upscaled full frame image 203 may include $N^2$ as many pixels as the original full frame image 201 (and the foveal image 202). As such, the upscaled full frame image 203 has less visual information per unit area than the foveal image.

Figure 3:
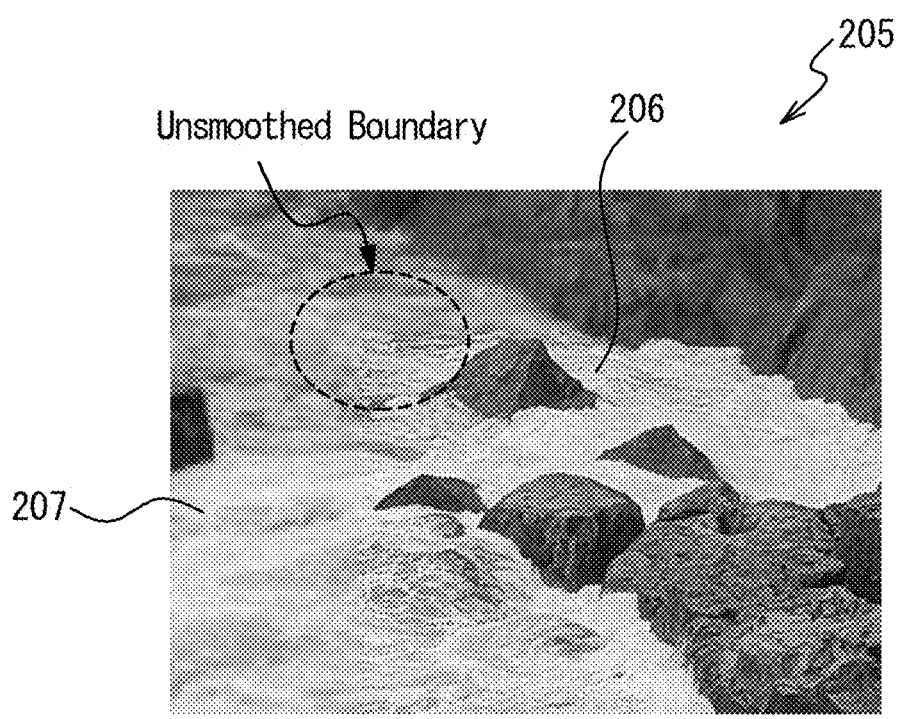
FIG. 3 illustrates an example foveated image that suffers from an unsmoothed boundary of a foveal image.

As discussed above, merging the foveal image 202 with the upscaled full frame image 203 may result in an unsmoothed boundary around the foveal image 202. FIG. 3 illustrates an example foveated image 205 in which a foveal image 206 is overlayed upon an upscaled full frame image 207, the foveated image 205 having an unsmoothed boundary around the foveal image 206. The unsmoothed boundary may be noticeable or even jarring to the user, thereby resulting in poor user experience.

Figure 4A:
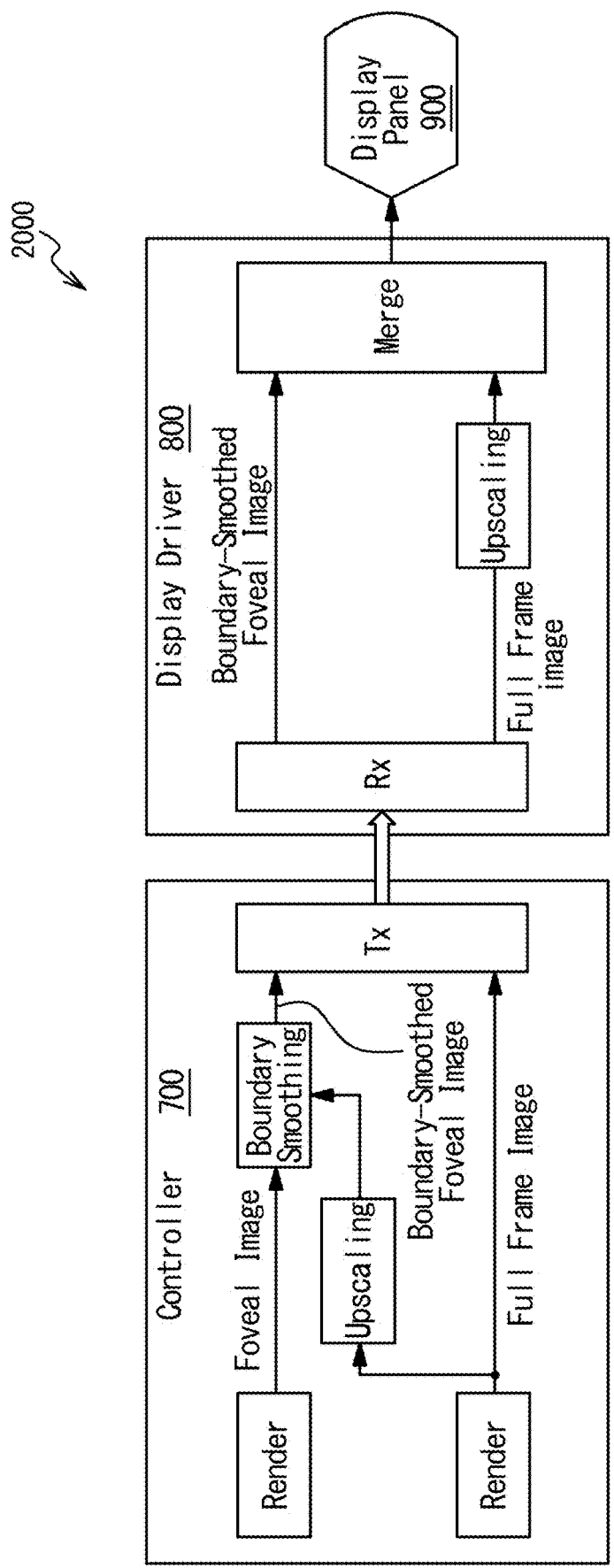
FIG. 4A illustrates an example configuration of a display system.

Aspects of the present disclosure may mitigate the unsmoothed boundary of the foveal image by applying a boundary smoothing process to the foveal image in the controller and transmitting the boundary-smoothed foveal image to the display driver. FIG. 4A illustrates an example configuration of a display system 2000 configured for boundary smoothing. The illustrated display system 2000 includes a controller 700, a display driver 800 and a display panel 900. The controller 700 is configured as a source configured to render a foveal image and a full frame image. The controller 700 is further configured to apply boundary smoothing to the foveal image and transmit a boundary-smoothed foveal image and the full frame image to the display driver 800. The display driver 800 is configured to upscale the full frame image and merge the boundary-smoothed foveal image with the upscaled full frame image to render a foveated image displayed on the display panel 900.

Boundary smoothing based on the upscaled full frame image (not the original full frame image) may increase processing overhead of the controller 700. Further, in situations where the controller 700 is not fully informed of the specification of the display driver 800 (e.g., the controller 700 and display driver 800 are manufactured by different vendors), the upscaling may need to be performed by the display driver 800.

Figure 4B:
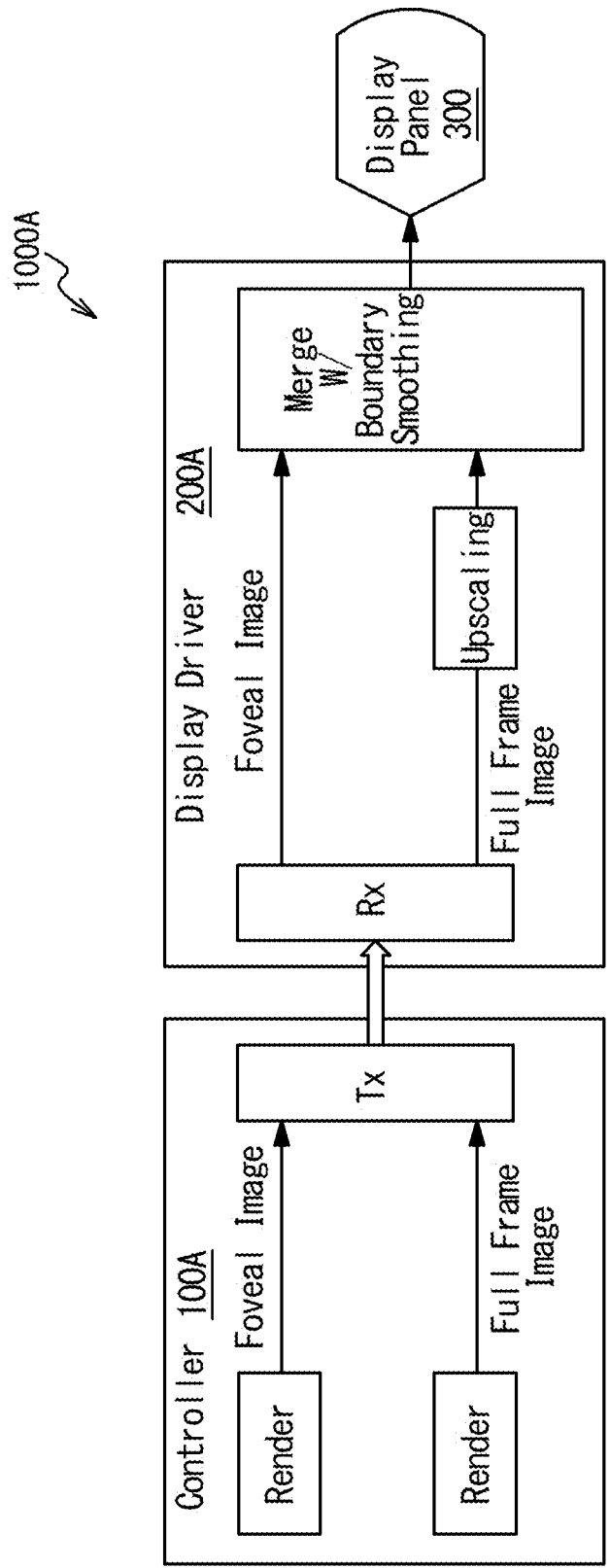
FIG. 4B illustrates an example architecture of a display system for efficient boundary smoothing, according to one or more embodiments.

FIG. 4B illustrates an example architecture of a display system 1000A for efficiently achieving boundary smoothing, according to one or more embodiments. In the illustrated embodiment, a controller 100A is configured as a source configured to provide a foveal image and a full frame image to a display driver 200A. The display driver 200A is configured to upscale the full frame image and merge the foveal image with the upscaled full frame image to generate a foveated image to be displayed on the display panel 300. The display driver 200A is further configured to perform boundary smoothing when merging the foveal image with the upscaled full frame image.

Figure 4C:
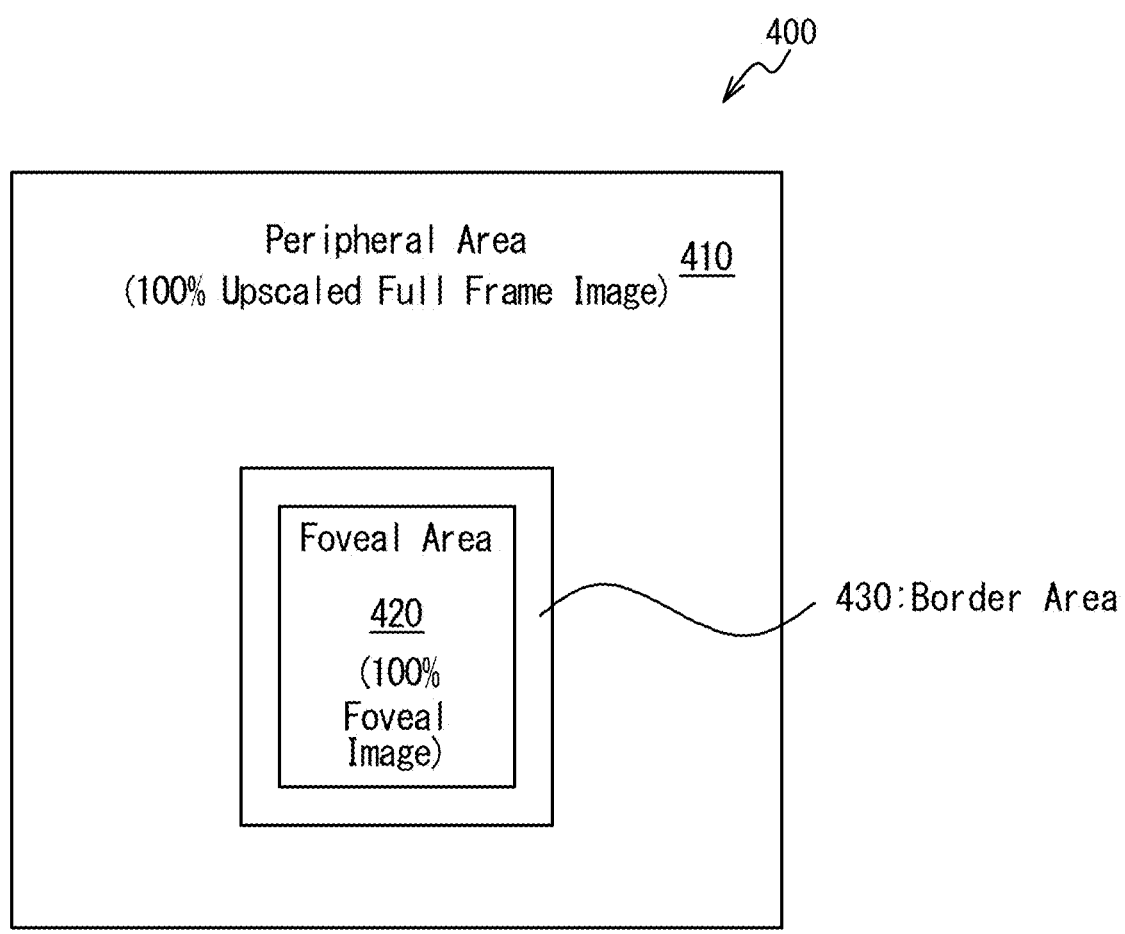
FIG. 4C illustrates an example configuration of a resulting image, according to one or more embodiments.

FIG. 4C illustrates an example configuration of a foveated image 400, according to one or more embodiments. In one or more embodiments, the foveated image 400 includes a peripheral area 410, a foveal area 420, and a border area 430. The foveal area 420 is framed or surrounded by the peripheral area 410, and the border area 430 is located between the peripheral area 410 and the foveal area 420. The display driver 200A is configured to render the peripheral area 410 of the foveated image 400 based on the upscaled full frame image and render the foveal area 420 of the foveated image 400 based on the foveal image. The display driver 200A is further configured to render the border area 430 of the foveated image 400 by blending the pixels of the foveal image with the pixels of the upscaled full frame image inside the border area 430 to achieve boundary smoothing. It is noted that the shapes of the peripheral area 410, the foveal area 420, and the border area 430 may be different than illustrated. The shapes of the peripheral area 410, the foveal area 420, and the border area 430 may regular (e.g., as illustrated in FIG. 4C) or irregular.

Figure 5:
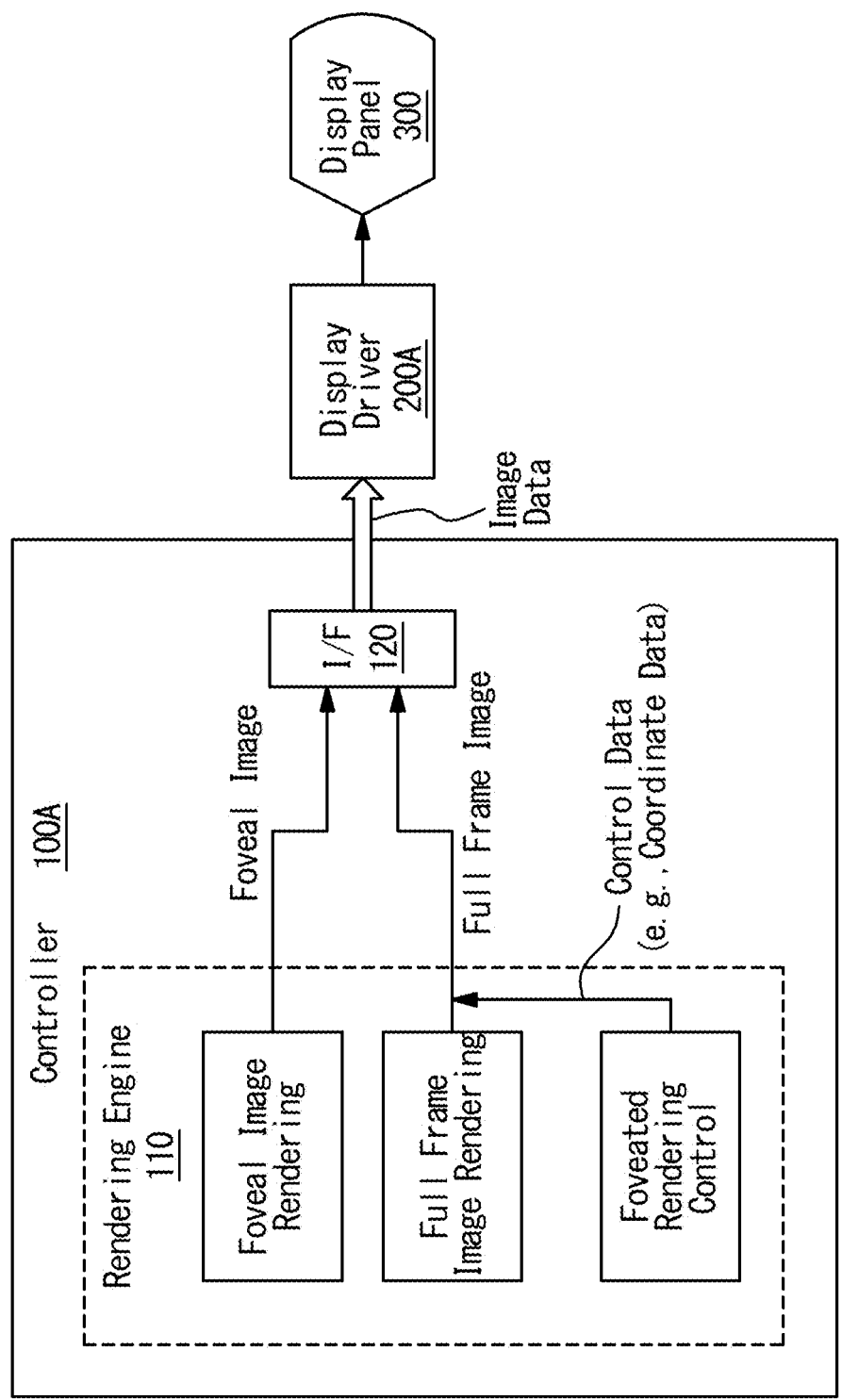
FIG. 5 illustrates an example configuration of a controller, according to one or more embodiments.

FIG. 5 illustrates an example configuration of the controller 100A of FIG. 4B, according to one or more embodiments. In the illustrated embodiment, the controller 100A includes a rendering engine 110 and interface circuitry 120. In some embodiments, the rendering engine 110 is configured to render a foveal image and a full frame image. In other embodiments, the controller 100A may be configured to receive a foveal image and a full frame image from an entity external to the controller 100A. The rendering engine 110 may be further configured to generate control data used to control the merger of the foveal image with the full frame image in the display driver 200A, including rendering of the border area 430 (illustrated in FIG. 4C). In some implementations, the control data may include coordinate data that indicates a position of the foveal image relative to (e.g., overlaid upon) the upscaled full frame image. The coordinate data may indicate coordinates of the foveal image in the foveated image 400. The control data may further include border area control data that specifies one or more dimensions of the border area 430. For example, the border area control data may indicate a size of the border area 430. In some embodiments, the control data may be embedded as pixel data in the full frame image. For example, the pixel data may be embedded in a portion of the full frame image which is not displayed on the display panel 300 (such as the corners of the display area of the display panel 300). The interface circuitry 120 is configured to transmit the foveal image and the full frame image to the display driver 200A as image data. The image data may include graylevels of pixels in the foveal image and the full frame image. In some embodiments, the interface circuitry 120 may be further configured to transmit the control data to the display driver 200A separately from the image data for the full frame image.

FIG. 6 illustrates an example data format of image data transmitted from the controller 100A to the display driver 200A during one frame period, according to one or more embodiments. In FIG. 6, each row represents data transmitted during one horizontal sync period. "VS" designates a vertical sync packet that indicates a start of the frame period, and "HS" designates a horizontal sync packet that indicates a start of a horizontal sync period. "VBP" designates a vertical back porch, "VFP" designates a vertical front porch, "HBP" designates a horizontal back porch, and "HFP" designates a horizontal front porch. "Foveal Image #1" to "Foveal Image #M" collectively designate image data for the foveal image, where "Foveal Image #i" designates the image data for the i-th horizontal line of the foveal image, where i is an integer from one to M. Further, "Full Frame Image #1" to "Full Frame Image #M" collectively designate the image data for the full frame image, where "Full Frame Image #i" designates the image data of the i-th horizontal line of the full frame image. In the illustrated embodiment, the control data is embedded as pixel data for the full frame image. In other embodiments, the coordinate data may be embedded at a different location within the full frame image.

Figure 7A:
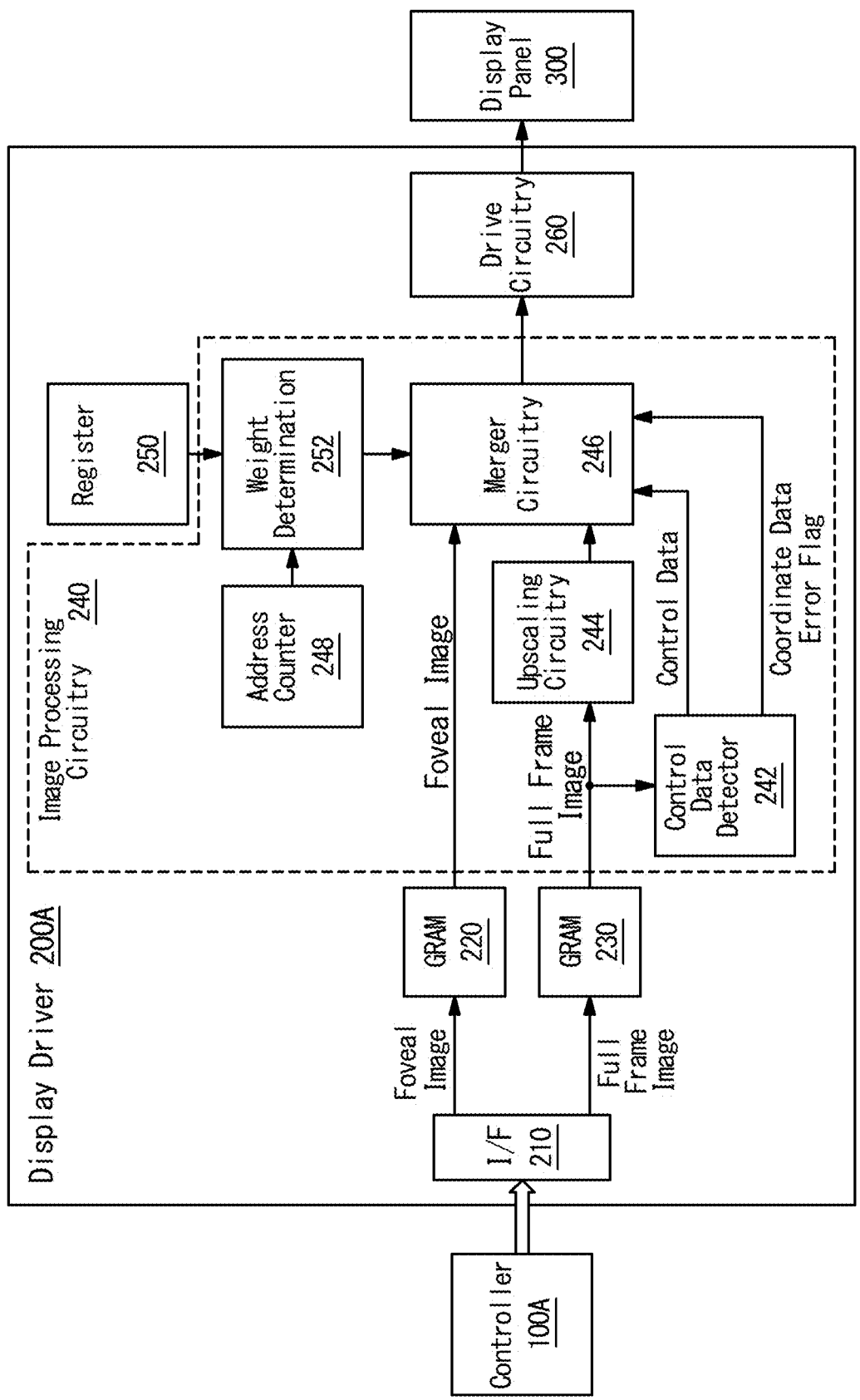
FIG. 7A illustrates an example configuration of a display driver, according to one or more embodiments.

FIG. 7A illustrates an example configuration of the display driver 200A, according to one or more embodiments. In the illustrated embodiment, the display driver 200A includes interface circuitry 210, graphic random-access memories (GRAMs) 220, 230, image processing circuitry 240, a register 250, and drive circuitry 260. In some implementations, the display driver 200A may be configured as a display driver integrated circuit (DDIC) in which the interface circuitry 210, the GRAMs 220, 230, the image processing circuitry 240, the register 250, and the drive circuitry 260 are monolithically integrated in a single semiconductor chip.

The interface circuitry 210 is configured to receive the foveal image and the full frame image from the controller 100A. The interface circuitry 210 is further configured to forward the foveal image to the GRAM 220 and the full frame image to the GRAM 230. The interface circuitry 210 may be configured to process the foveal image and/or the full frame image and forward the processed foveal image and/or the full frame image to the GRAMs 220 and/or 230. In embodiments where the control data is transmitted to the display driver 200A separately from the full frame image, the interface circuitry 210 may be further configured to receive the control data from the controller 100A and forward the control data to the image processing circuitry 240. The GRAM 220 is configured to store the foveal image received from the interface circuitry 210 and the GRAM 230 is configured to store the full frame image received from the interface circuitry 210. In other embodiments, the GRAM 230 may be omitted and the full frame image may be provided from the interface circuitry 210 to the image processing circuitry 240. The image processing circuitry 240 is configured to upscale the full frame image and render a foveated image based on the foveal image and the upscaled full frame image. The foveated image may be a-rendered by merging the foveal image with the upscaled full frame image. The register 250 is configured to store border area dimension data set that indicates one or more dimensions of the border area 430 (illustrated in FIG. 4C.) The border area dimension data may define the configuration and/or shape of the border area 430. The drive circuitry 260 is configured to drive the display panel 300 to display the foveated image on the display panel 300.

In the illustrated embodiment, the image processing circuitry 240 includes a control data detector 242, upscaling circuitry 244, merger circuitry 246, an address counter 248, and weight determination circuitry 252. The control data detector 242 is configured to extract the control data embedded in the full frame image and forward the control data to the merger circuitry 246. In some embodiments, the control data detector 242 may be further configured to extract coordinate data (indicating the position of the foveal image relative to the upscaled full frame image) from the image data for the full frame image and detect a data error within the extracted coordinate data. The data error detection of the coordinate data may be based on a cyclic redundancy check or other error detection technologies. In some implementations, the control data detector 242 is configured to assert a coordinate data error flag in response to detecting a data error within the coordinate data and deassert the coordinate data error flag if no data error is detected within the coordinate data.

The upscaling circuitry 244 is configured to upscale the full frame image and provide the upscaled full frame image to the merger circuitry 246. In some implementations, the upscaled full frame image may be N times larger than the full frame image received from the controller 100A, where N is an integer value greater than one. In some implementations, the upscaled full frame image may include $N^2$ times as many pixels as the original full frame image.

The merger circuitry 246 is configured to merge the foveal image with the upscaled full frame image to render a foveated image. As described in relation to FIG. 4C, the foveated image 400 includes the peripheral area 410, the foveal area 420, and the border area 430. In one or more embodiments, the merger circuitry 246 is configured to render the peripheral area 410 of the foveated image 400 based on the upscaled full frame image and render the foveal area 420 of the foveated image 400 based on the foveal image. The merger circuitry 246 is further configured to render the border area 430 of the foveated image 400 by blending the pixels of the foveal image with the pixels of the upscaled full frame image inside the border area 430 to achieve boundary smoothing. In one or more embodiments, the pixels of the foveal image may be blended with the pixels of the upscaled full frame image using alpha blending techniques.

In some embodiments, the merger circuitry 246 may render a resulting image based on whether a data error is detected within the coordinate data. In some embodiments, when no data error is detected within the coordinated data (e.g., in response to a deassertion of the coordinate data error flag), the merger circuitry 246 may render a foveated image as the resulting image by merging the foveal image with the upscaled full frame image such that the foveal image is positioned in the upscaled full frame image as specified by the coordinate data. In some other embodiments, when a data error is detected within the coordinated data (e.g., in response to an assertion of the coordinate data error flag), the merger circuitry 246 may output the upscaled full frame image as the resulting image without merging the foveal image into the upscaled full frame image. The absence of merging may effectively mitigate or avoid corruption of the resulting image displayed on the display panel 300.

Figure 7B:
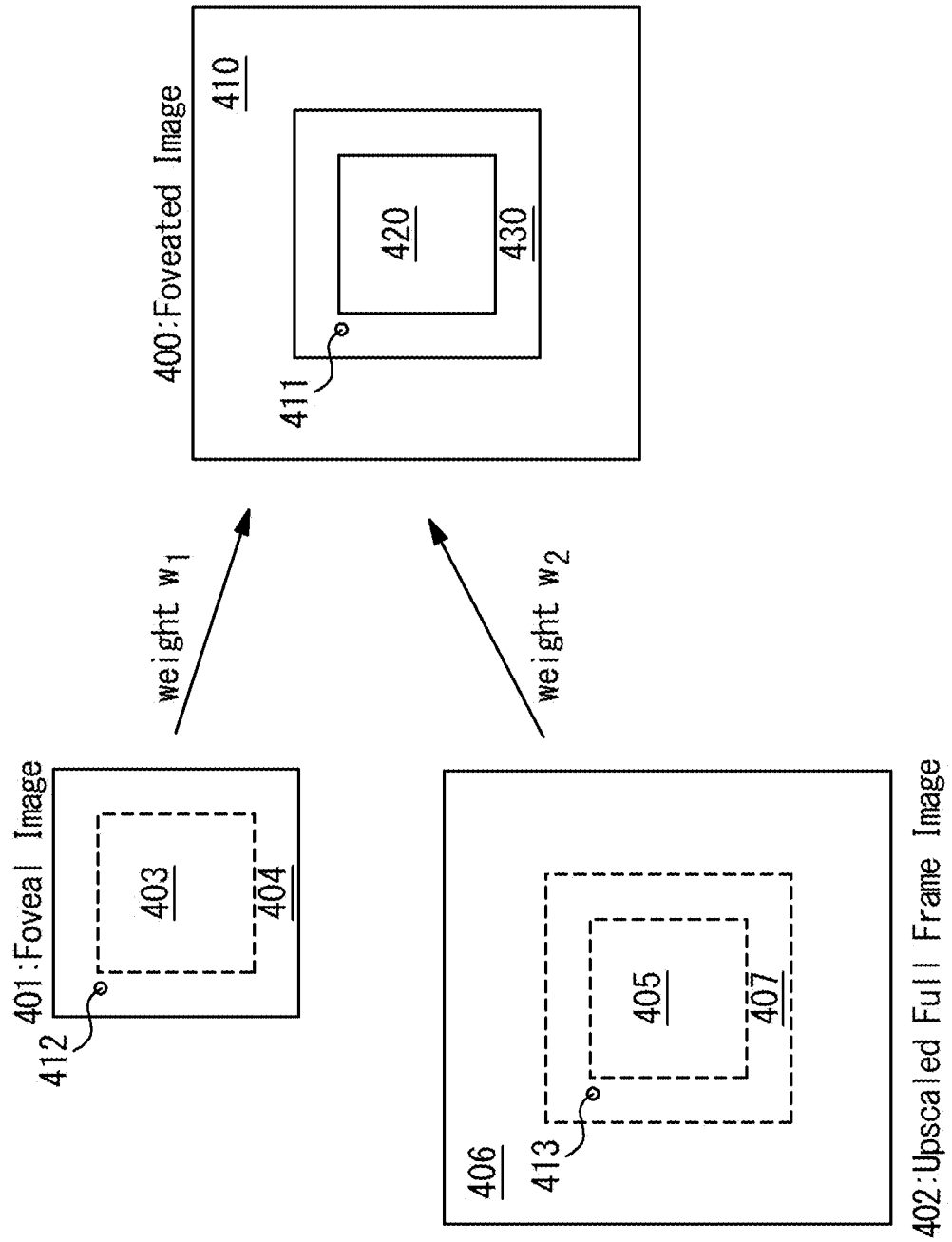
FIG. 7B illustrates an example merger of a foveal image and an upscaled full frame image for rendering a foveated image, according to one or more embodiments.

FIG. 7B illustrates example merger of the foveal image (denoted by numeral 401) and the upscaled full frame image (denoted by numeral 402) for rendering a foveated image 400, according to one or more embodiments. In the illustrated embodiment, the foveal image 401 includes an inner portion 403 and an outer portion 404, and the upscaled full frame image 402 includes an inner portion 405, an outer portion 406, and a middle portion 407. The inner portion 403 and outer portion 404 of the foveal image 401 map to the foveal area 420 and border area 430, respectively, of the foveated image 400. More specifically, the shape and position of the inner portion 403 of the foveal image 401 match the shape and position of the foveal area 420 of the foveated image 400, and the shape and position of the outer portion 404 of the foveal image 401 match the shape and position of the border area 430 of the foveated image 400. The inner portion 405, outer portion 406, and middle portion 407 of the upscaled full frame image 402 map to the foveal area 420, the peripheral area 410, and border area 430, respectively, of the foveated image 400. More specifically, the shape and position of the inner portion 405 of the upscaled full frame image 402 match the shape and position of the foveal area 420 of the foveated image 400, and the shape and position of the outer portion 406 of the upscaled full frame image 402 match the shape and position of the peripheral area 410 of the foveated image 400. Further, the shape and position of the middle portion 407 of the upscaled full frame image 402 match the shape and position of the border area 430 of the foveated image 400.

In some embodiments, pixel values in the foveal area 420 of the foveated image 400 are derived directly (or exclusively) from pixel values in the inner portion 403 of the foveal image 401, and pixel values in the peripheral area 410 of the foveated image 400 are derived directly (or exclusively) from pixel values in the outer portion 406 of the upscaled full frame image 402. In some embodiments, pixel values in the border area 430 of the foveated image 400 are derived from pixel values in the outer portion 404 of the foveal image 401 and from pixel values in the middle portion 407 of the upscaled full frame image 402. More specifically, the pixel values in the outer portion 404 of the foveal image 401 are merged or blended with the pixel values in the middle portion 407 of the upscaled full frame image 402 to render the pixel values in the border area 430 of the foveated image 400.

In some embodiments, the merger of the outer portion 404 of the foveal image 401 and the middle portion 407 of the upscaled full frame image 402 may include determining the graylevel of a target pixel 411 of the border area 430 based on a weighted sum of the graylevel of a corresponding pixel 412 in the outer portion 404 of the foveal image 401 and the graylevel of a corresponding pixel 413 in the middle portion 407 of the upscaled full frame image 402, where the corresponding pixel 412 in the outer portion 404 of the foveal image 401 and the corresponding pixel 413 in the middle portion 407 of the upscaled full frame image 402 map to the position of the target pixel 411 in the border area 430. In some implementations, the graylevel of the target pixel 411 may be determined as a weighted sum of the graylevel of the corresponding pixel 412 of the foveal image 401 and the graylevel of the corresponding pixel 413 of the upscaled full frame image 402. The graylevel $P_T$ of the target pixel 411 may be determined in accordance with the following expression (1):

$$P_T = w_1 P_1 + w_2 P_2, \qquad (1)$$

where $w_1$ is the weight allocated to the corresponding pixel 412 of the foveal image 401, $P_1$ is the graylevel of the corresponding pixel 412, $w_2$ is the weight allocated to the corresponding pixel 413 of the upscaled full frame image 402, and $P_2$ is the graylevel of the corresponding pixel 413.

Referring back to FIG. 7A, the address counter 248, the register 250, and the weight determination circuitry 252 are collectively configured to determine the weights assigned to the corresponding pixel 412 of the foveal image 401 and the corresponding pixel 413 of the upscaled full frame image 402 in the weighted sum. The address counter 248 is configured to determine the position of the target pixel 411 in the foveated image 400 for which the graylevel is to be determined. In one implementation, the address counter 248 may be configured to count a dot clock signal, a horizontal sync signal, and a vertical sync signal to determine the position of the target pixel 411. The register 250 is configured to store a border area dimension data set that indicates one or more dimensions of the border area 430 (illustrated in FIG. 4C.) The border area dimension data may indicate the configuration and/or shape of the border area 430.

In some embodiments, the weight determination circuitry 252 is configured to, in determining the graylevel of the target pixel 411 of the foveated image 400, determine the weight assigned to the corresponding pixel 412 of the foveal image 401 and the weight assigned to the corresponding pixel 413 of the upscaled full frame image 402 based on the position of the target pixel 411 in the foveated image 400. The weight determination circuitry 252 may be configured to determine the area in which the target pixel 411 is positioned among the peripheral area 410, the foveal area 420, and the border area 430 based on the position of the target pixel 411 and the border area dimension data set stored in the register 250 and determine the weight assigned to the corresponding pixel 412 of the foveal image 401 and the weight assigned to the corresponding pixel 413 of the upscaled full frame image 402 based on the area in which the target pixel is positioned. In some embodiments, the weight determination circuitry 252 may be configured to determine the weight assigned to the corresponding pixel 412 of the foveal image 401 as 100% when the target pixel 411 is positioned in the foveal area 420 of the foveated image 400. The weight determination circuitry 252 may be further configured to determine the weight assigned to the corresponding pixel 412 of the foveal image 401 as 0% when the target pixel 411 is positioned in the peripheral area 410 of the foveated image 400. The weight determination circuitry 252 may be further configured to determine the weight assigned to the corresponding pixel 412 of the foveal image 401 as a value between 0% and 100%, when the target pixel 411 is positioned in the border area 430 of the foveated image 400. In embodiments where the merger of the foveal image 401 with the upscaled full frame image 402 to render the border area 430 is achieved through alpha blending, the weight assigned to the corresponding pixel 412 of the foveal image 401 may be an alpha value assigned to the corresponding pixel 412 of the foveal image 401.

Figure 8:
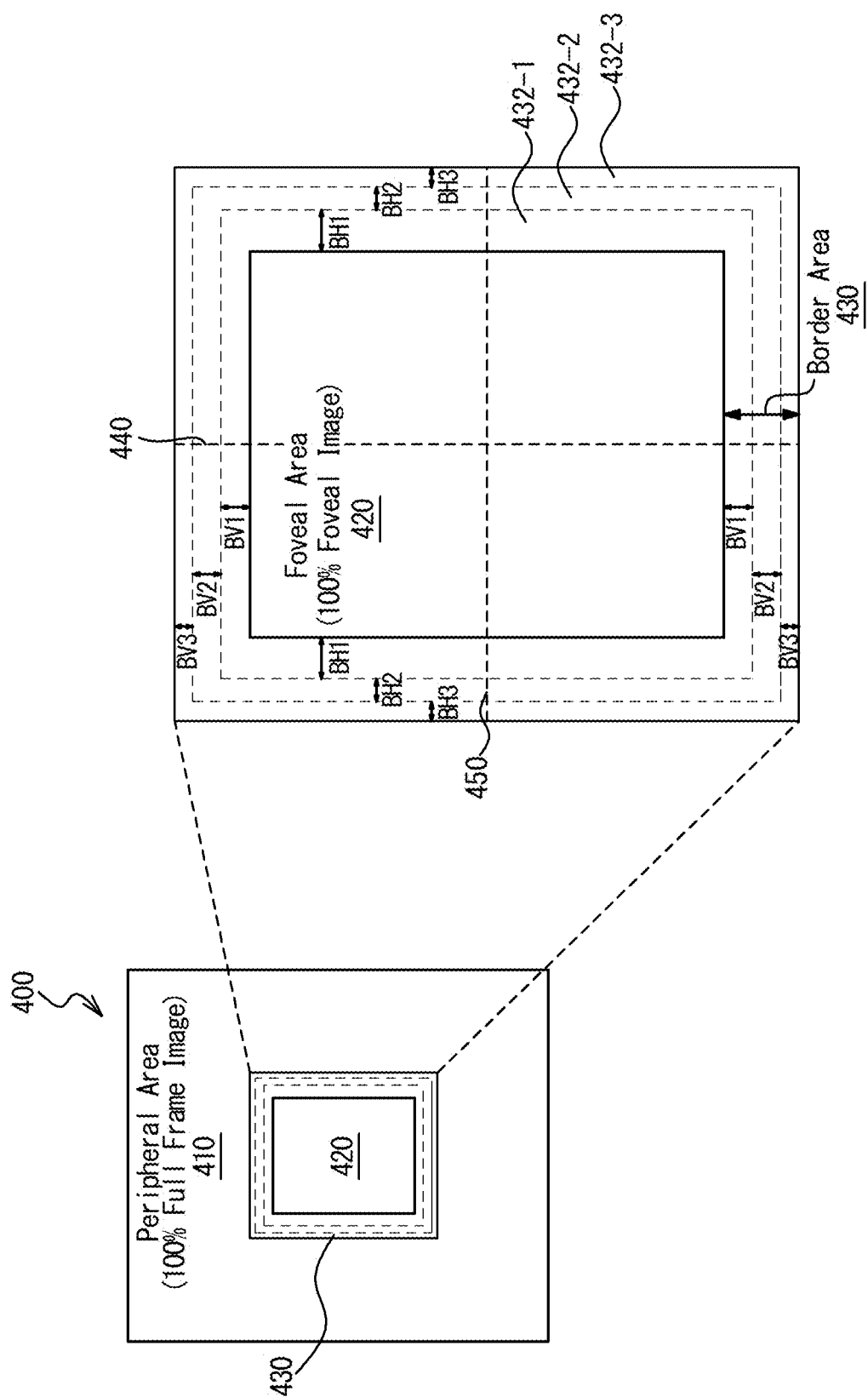
FIG. 8 illustrates an example configuration of a foveated image, according to one or more embodiments.

In one or more embodiments, the dimensions of the border area 430, which is disposed between the peripheral area 410 and the foveal area 420, may be indicated by the border area dimension data set stored in the register 250. FIG. 8 illustrates an example configuration of the foveated image 400 in which the border area 430 is disposed between the peripheral area 410 and the foveal area 420, according to one or more embodiments. In the illustrated embodiment, the border area 430 include a first section 432-1, a second section 432-2, and a third section 432-3, which are defined as a rectangular frame shape. In one implementation, the first section 432-1 may be defined to completely or substantially surround the foveal area 420, the second section 432-2 may be defined to completely or substantially surround the first section 432-1, and the third section 432-3 may be defined to completely or substantially surround the second section 432-2. In FIG. 8, the numeral 440 denotes a vertical center line of the foveal image and the numeral 450 denotes a horizontal center line of the foveal image.

In one or more embodiments, the border area dimension data set stored in the register 250 indicates the dimensions of the first to third sections 432-1 to 432-3 of the border area 430. In the illustrated embodiment, the border area dimension data set include the following dimensions of the first to third sections 432-1 to 432-3:

BV1: the width of the upper and bottom horizontal portions of the first section 432-1 in the vertical direction.

BH1: the width of the vertical portions of the first section 432-1 in the horizontal direction.

BV2: the width of the upper and bottom horizontal portions of the second section 432-2 in the vertical direction.

BH2: the width of the vertical portions of the second section 432-2 in the horizontal direction.

BV3: the width of the upper and bottom horizontal portions of the third section 432-3 in the vertical direction.

BH3: the width of the vertical portions of the third section 432-3 in the horizontal direction.

The image processing circuitry 240 is configured to modify at least one of the dimensions of the border area 430 by updating the border area dimension data set stored in the register 250. The modification of the dimensions of the border area 430 may be based on the control data received from the controller 100A. In one implementation, the border area dimension data set is rewritable by the controller 100A. The rewriting of the border area dimension data set provides an easy adjustment of one or more dimensions of the border area 430.

As described above in relation to FIG. 7B, the graylevel of a target pixel of the border area 430 may be equal to the weighted sum of the graylevel of the corresponding pixel of the foveal image and the graylevel of the corresponding pixel of the upscaled full frame image. In such embodiments, the weight assigned to the corresponding pixel in the foveal image and the weight assigned to the corresponding pixel in the upscaled full frame image are determined based on the position of the target pixel in the foveated image 400. In some implementations, the weight assigned to the corresponding pixel of the foveal image may increase as the distance of the target pixel from the foveal area 420 decreases. By determining the weight in this way, the foveal image and the upscaled full frame image are blended inside the border area 430 gradually changing the ratio of the foveal image to upscaled full frame image, and this may effectively smooth the boundary of the foveal area 420.

Figure 9:
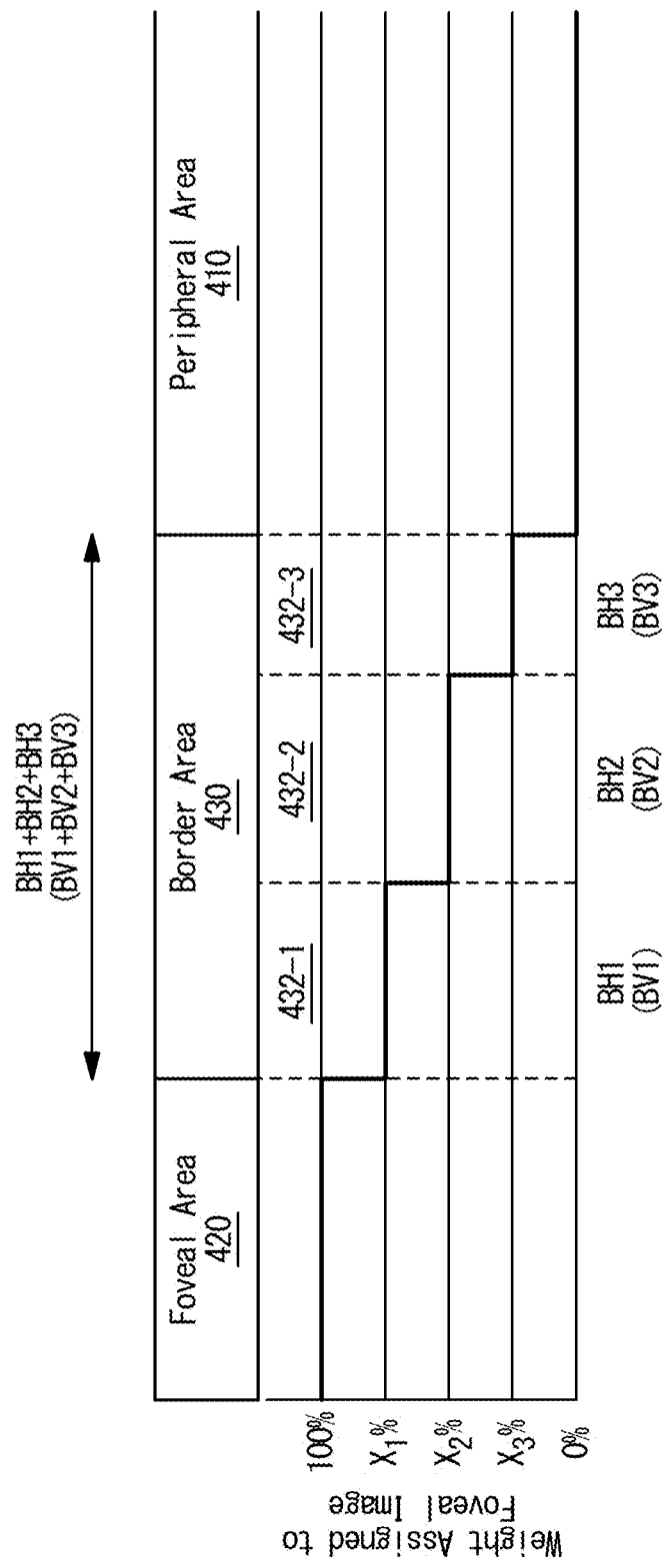
FIG. 9 illustrates example weights assigned to pixels of a foveal image in determining graylevels of pixels in a border area as weighted sums, according to one or more embodiments.

In some embodiments, the weight assigned to the corresponding pixel of the foveal image may be based on the section in which the target pixel is positioned. FIG. 9 illustrates example weights assigned to the graylevels of corresponding pixels of a foveal image, according to one or more embodiments.

In the embodiment illustrated in FIG. 9, when the target pixel is located in the foveal area 420, the weight assigned to the corresponding pixel in the foveal image is 100%. In such cases, the graylevel of the target pixel is determined as equal to the graylevel of the corresponding pixel in the foveal image. Accordingly, the foveal area 420 of the foveated image 400 is rendered based on the foveal image, independently of the upscaled full frame image.

When the target pixel is positioned in the first section 432-1 of the border area 430, which is the section closest to the foveal area 420, the weight assigned to the corresponding pixel of the foveal image is $X_1$%. As such, the weight assigned to the corresponding pixel of the upscaled full frame image is 100-$X_1$%.

Further, the weight assigned to the corresponding pixel of the foveal image is $X_2$% when the target pixel is positioned in the second section 432-2 of the border area 430 and $X_3$% when the target pixel is positioned in the third section 432-3 of the border area 430. In one implementation, the weight assigned to the corresponding pixel of the foveal image may increase as the target pixel is closer to the foveal area 420. As such, the weight $X_1$ assigned to the corresponding pixel of the foveal image for the case when the target pixel is positioned in the first section 432-1 is larger than the weight $X_2$ assigned to the corresponding pixel of the foveal image for the case when the target pixel is positioned in the second section 432-2, and the weight $X_2$ is larger than the weight $X_3$ assigned to the corresponding pixel of the foveal image for the case when the target pixel is positioned in the third section 432-3.

When the target pixel is located in the peripheral area 410, the weight assigned to the corresponding pixel of the foveal image is 0%. In such cases, the graylevel of the target pixel is equal to the graylevel of the corresponding pixel of the upscaled full frame image. Accordingly, the peripheral area 410 of the foveated image 400 is rendered based solely on the upscaled full frame image (and not on the foveal image).

Figure 10:
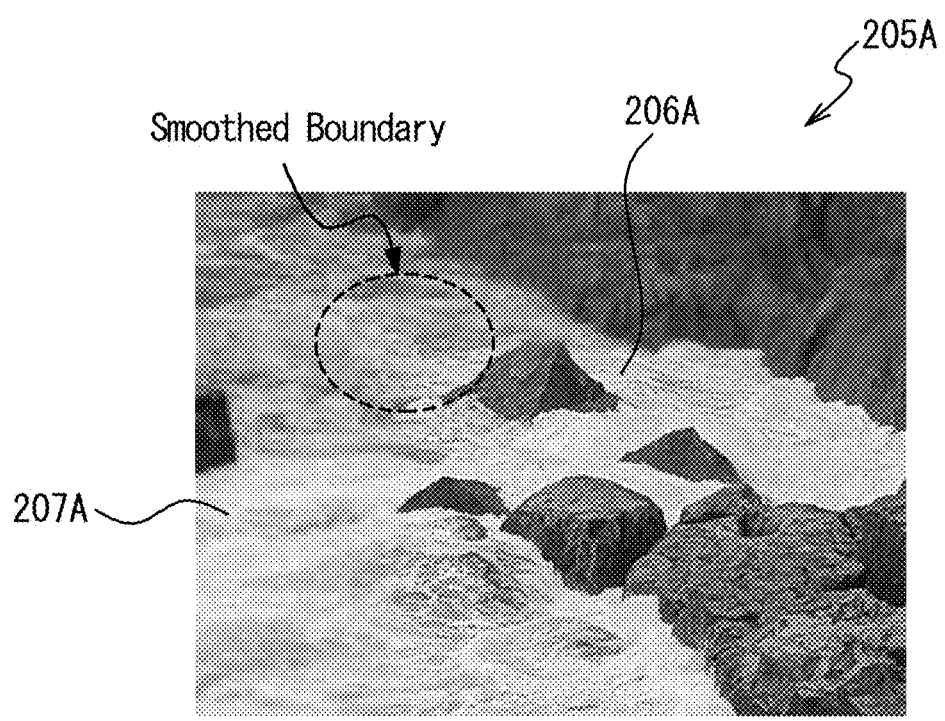
FIG. 10 illustrates an example foveated image, according to one or more embodiments.

FIG. 10 illustrates an example foveated image 205A in which a foveal image 206A is overlayed upon an upscaled full frame image 207A using the weights assigned to the pixels of the foveal image 206A and the upscaled full frame image 207A as illustrated FIG. 9, according to one or more embodiments. In the example foveated image 205A, the boundary of the foveal image 206A is smoothed to mitigate an artifact at the boundary.

The image processing circuitry 240 may be further configured to perform additional image processing on the foveated image rendered by the merger circuitry 246 and forward the image generated through the image processing to the drive circuitry 260. The image processing performed by the image processing circuitry 240 may include color adjustment, gamma transformation, overdriving, or other image processes.

Figure 11:
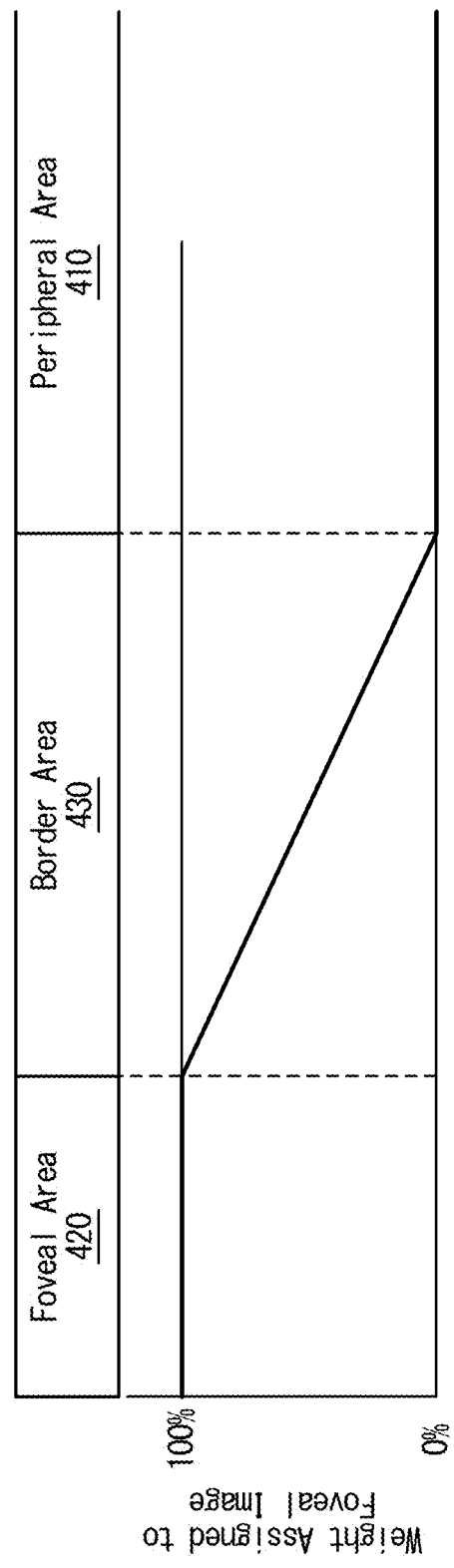
FIG. 11 illustrates example weights assigned to pixels in a foveal image, according to one or more embodiments.

FIG. 11 illustrates example weights assigned to pixels in a foveal image, according to some other embodiments. In the illustrated embodiment, the weight assigned to the foveal image gradually (e.g., monotonically) increases as the distance of the target pixel from the foveal area 420 decreases while the weight assigned to the upscaled full frame image gradually (e.g., monotonically) increases as the distance of the target pixel from the peripheral area 410 decreases. While FIG. 11 illustrates the weight assigned to the graylevel of the pixel in the foveal image linearly increases as the distance of the target pixel from the foveal area 420 decreases, the weight assigned to the graylevel of the pixel in the foveal image may non-linearly increase.

Figure 12:
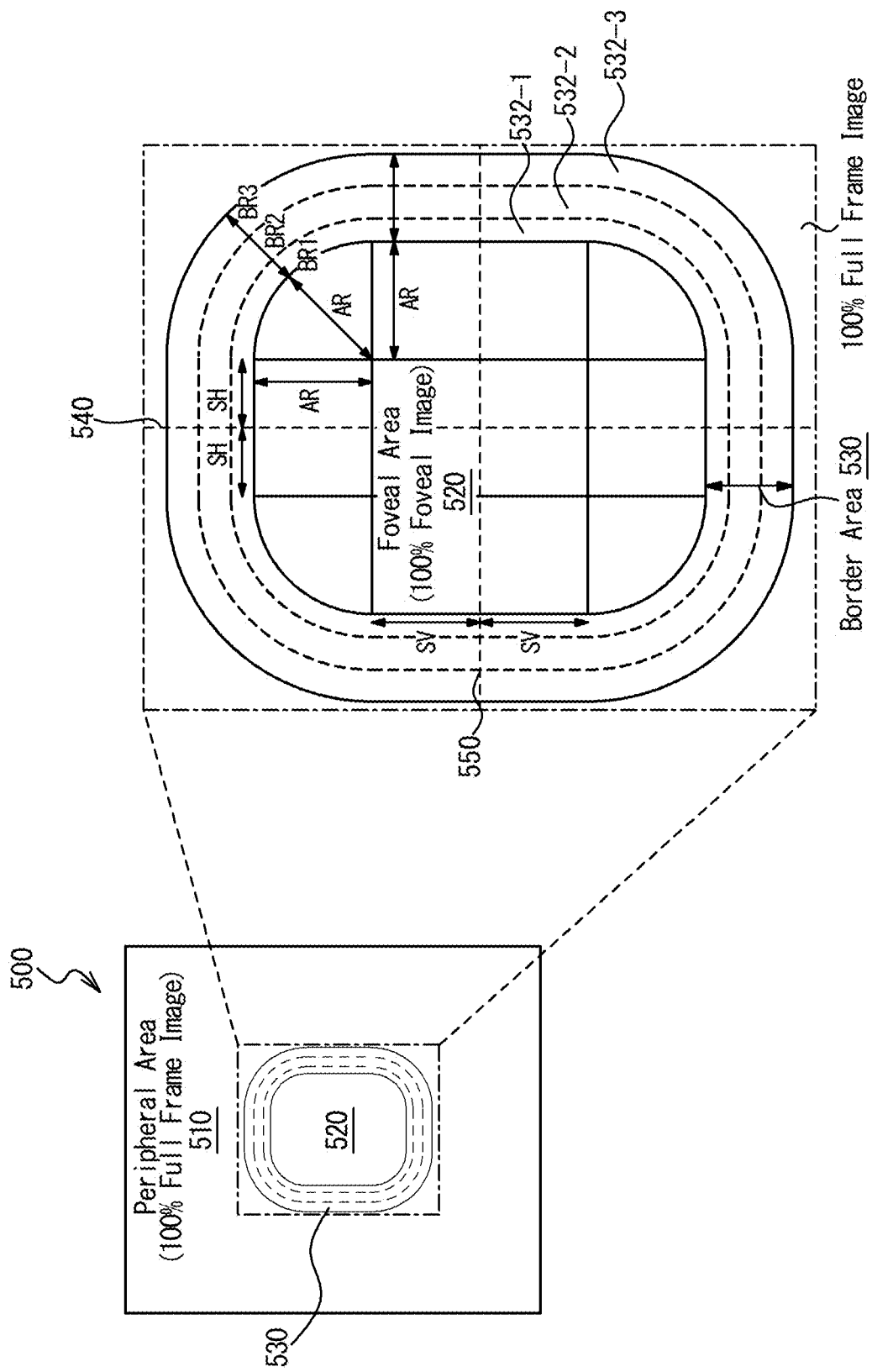
FIG. 12 illustrates an example configuration of a foveated image, according to one or more embodiments.

FIG. 12 illustrates an example configuration of a foveated image 500, according to other embodiments. The foveated image 500 includes a peripheral area 510, a foveal area 520, and a border area 530 disposed between the peripheral area 510 and the foveal area 520. In FIG. 12, the numeral 540 denotes the vertical center line of the foveal image, and the numeral 550 denotes the horizontal center line of the foveal image. In the illustrated embodiment, the corners of the foveal area 520 and the border area 530 are rounded. Each of the four corners of the inner boundary of the border area 530 (that is, the four corners of the foveal area 520) is shaped as the circumference of a quarter circle of a radius AR, and adjacent corners are connected by a line segment. Each of the four corners of the outer boundary of the border area 530 is also shaped as the circumference of a quarter circle.

In the illustrated embodiment, the border area 530 includes a first section 532-1, a second section 532-2, and a third section 532-3. In one implementation, the first section 532-1 may be looped to surround the foveal area 520, and the second section 532-2 and the third section 532-3 may be looped to surround the first section 532-1 and the second section 532-2, respectively, while the first section 532-1, the second section 532-2, and the third section 532-3 each have a constant width. While FIG. 12 illustrates three sections 532-1, 532-2, and 532-3, the border area 530 may include two, four or more sections.

In one or more embodiments, the border area dimension data set stored in the register 250 indicates the dimensions of the border area 530, including the dimensions of the first to third sections 532-1 to 532-3. In the illustrated embodiment, the border area dimension data set includes the following dimensions:

AR: the radius of the corners of the inner boundary of the border area 530.

SH: the distance between the vertical center line 540 and the corners of the inner boundary of the border area 530.

SV: the distance between the horizontal center line 550 and the corners of the inner boundary of the border area 530.

BR1: the width of the first section 532-1.
BR2: the width of the second section 532-2.
BR3: the width of the third section 532-3.

The image processing circuitry 240 is configured to modify at least one of the dimensions of the border area 530 by updating the border area dimension data set stored in the register 250. The modification of the dimensions of the border area 530 may be based on the control data received from the controller 100A. In some implementations, the border area dimension data set is rewritable by the controller 100A. The rewriting of the border area dimension data set provides an easy adjustment of one or more dimensions of the border area 530.

Figure 13:
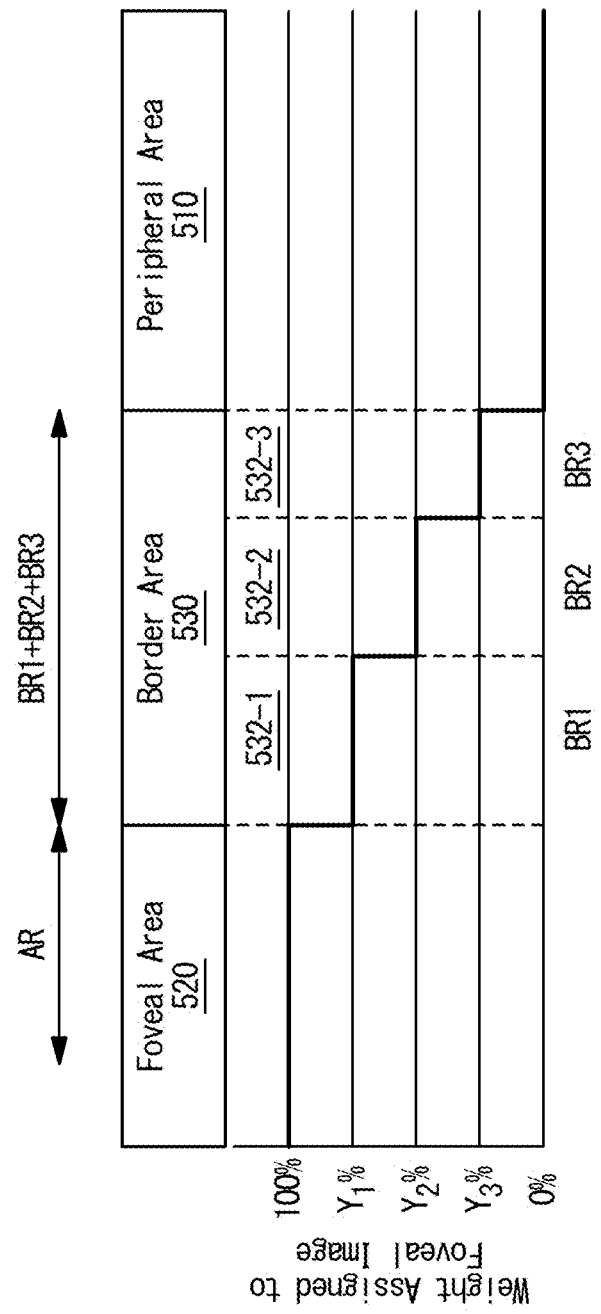
FIG. 13 illustrates example weights assigned to pixels of a foveal image in determining graylevels of pixels of a border area as weighted sums, according to one or more embodiments.

FIG. 13 illustrates example weights assigned to pixels in a foveal image, according to one or more embodiments. In the illustrated embodiment, when the target pixel is located in the foveal area 520, the weight assigned to the corresponding pixel of the foveal image is 100%. As such, the graylevel of the target pixel is equal to the graylevel of the corresponding pixel of the foveal image. Accordingly, the foveal area 520 of the foveated image 500 is rendered based solely on the foveal image (and not the upscaled full frame image).

When the target pixel is positioned in the first section 532-1 of the border area 530, which is closest to the foveal area 520, the weight assigned to the corresponding pixel of the foveal image is $Y_1$%. As such, the weight assigned to the corresponding pixel of the upscaled full frame image is $100-Y_1$%.

Further, the weight assigned to the corresponding pixel in the foveal image is $Y_2$% when the target pixel is positioned in the second section 532-2 of the border area 530, and $Y_3$% when the target pixel is positioned in the third section 532-3 of the border area 530. The weight $Y_1$ assigned to the corresponding pixel of the foveal image for the case when the target pixel is positioned in the first section 532-1 is larger than the weight $Y_2$ assigned to the corresponding pixel of the foveal image for the case when the target pixel is positioned in the second section 532-2, and the weight $Y_2$ is larger than the weight $Y_3$ assigned to the corresponding pixel of the foveal image for the case when the target pixel is positioned in the third section 532-3.

When the target pixel is located in the peripheral area 510, the weight assigned to the corresponding pixel of the foveal image is 0%. As such, the graylevel of the target pixel is equal to the graylevel of the corresponding pixel of the upscaled full frame image. Accordingly, the peripheral area 510 of the foveated image 500 is rendered based solely on the upscaled full frame image (and not the foveal image).

In one or more embodiments, the control data transmitted from the controller 100A to the display driver 200A may include border area control data and the display driver 200 may be configured to adjust the configuration of the border area 430 or 530 based on the border area control data. In some implementations, the border area control data may specify one or more dimensions of the border area 430 or 530.

In some embodiments, as illustrated in FIG. 14, the register 250 may be configured to store a plurality of border area dimension data sets that respectively define border areas with different configurations and/or different dimensions. In such embodiments, the border area control data may specify one of the border area dimension data sets, and the weight determination circuitry 252 may be configured to assign various weights to pixels of the foveal image and pixels of the upscaled full frame image based on the specified one of the border area dimension data sets.

In the illustrated embodiment, the register 250 is configured to store three border area dimension data sets 254-1, 254-2, and 254-3 that respectively define border areas of different sizes. The border area dimension data set 254-1 defines a border area of a "large" size; the border area dimension data set 254-2 defines a border area of a "medium" size, and the border area dimension data set 254-3 defines a border area of a "small" size.

In some embodiments, the border area control data may specify the border area size as "large", "medium," or "small". In such embodiments, the register 250 may be configured to select one of the border area dimension data sets 254-1, 254-2, and 254-3 based on the border area size specified by the border area control data and provide the selected border area dimension data set to the weight determination circuitry 252. The weight determination circuitry 252 may be configured to determine the weights assigned to the pixels of the foveal image and the weights assigned to pixels of the upscaled full frame image based on the selected border area dimension data set received from the register 250.

Method 1500 of FIG. 15 illustrates example steps for operating a display driver adapted to foveated rendering (e.g., the display driver 200A illustrated in FIG. 7A), according to one or more embodiments. It is noted that one or more of the steps illustrated in FIG. 15 may be omitted, repeated, and/or performed in a different order than the order illustrated in FIG. 15. It is further noted that two or more steps may be implemented at the same time.

The method includes receiving a full frame image and a foveal image from a source (e.g., the controller 100A illustrated in FIG. 5) external to the display driver at step 1502. The method further includes upscaling the full frame image at step 1504. The method further includes rendering a foveated image (e.g., the foveated images 400 and 500) from the upscaled full frame image and the foveal image at step 1506. The foveated image includes a foveal area (e.g., the foveal areas 420 and 520) based on the foveal image, a peripheral area (e.g., the peripheral areas 410 and 510 illustrated in FIGS. 4C, 8, and 12) based on the upscaled full frame image, and a border area (e.g., the border areas 430 and 530) based on the foveal image and the upscaled full frame image. The border area is located between the foveal area and the peripheral area. The method further includes driving a display panel (e.g., the display panel 300) based on the foveated image at step 1508.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:
   interface circuitry configured to receive a full frame image and a foveal image from a source external to the display driver;
   image processing circuitry configured to:
   upscale the full frame image;
   render a foveated image from the upscaled full frame image and the foveal image, wherein the foveated image comprises:
   a foveal area based on the foveal image;
   a peripheral area based on the upscaled full frame image; and a border area based on the foveal image and the upscaled full frame image, the border area being located between the foveal area and the peripheral area; and drive circuitry configured to drive a display panel using the foveated image.

2. The display driver of claim 1, wherein the rendering of the foveated image comprises determining a graylevel of a target pixel in the border area based on a weighted sum of a graylevel of a first pixel in the foveal image and a graylevel of a second pixel in the upscaled full frame image.

3. The display driver of claim 2, wherein a weight is assigned to the first pixel in the weighted sum based on a position of the target pixel in the border area.

4. The display driver of claim 3, wherein the weight assigned to the first pixel increases as a distance of the target pixel from the foveal area decreases.

5. The display driver of claim 1, wherein the border area comprises:

a first section that surrounds the foveal area; and
a second section that surrounds the first section,
wherein rendering the foveated image comprises:
determining a graylevel of a first target pixel in the first section based on a first weighted sum of a graylevel of a first pixel in the foveal image and a graylevel of a second pixel in the upscaled full frame image; and
determining a graylevel of a second target pixel in the second section based on a second weighted sum of a graylevel of a third pixel in the foveal image and a graylevel of a fourth pixel in the upscaled full frame image, and
wherein a first weight is assigned to the first pixel in the first weighted sum and a second weight is assigned to the third pixel in the second weighted sum, the first weight being larger than the second weight.

6. The display driver of claim 5, wherein the border area further comprises a third section that surrounds the second section, and wherein the rendering of the border area further comprises:
determining a graylevel of a third target pixel in the third section based on a third weighted sum of a graylevel of a fifth pixel in the foveal image and a graylevel of a sixth pixel in the upscaled full frame image,
wherein a third weight is assigned to the fifth pixel in the third weighted sum, the second weight being larger than the third weight.

7. The display driver of claim 1, further comprising:
a register configured to store a border area dimension data set that indicates one or more dimensions of the border area,
wherein the border area is rendered based on the border area dimension data set.

8. The display driver of claim 7, wherein the border area dimension data set is rewritable by the source.

9. The display driver of claim 1, wherein the image processing circuitry is further configured to:
receive, via the interface circuitry, control data from the source; and
modify at least one dimension of the border area based on the control data received from the source.

10. The display driver of claim 1, further comprising:
register circuitry configured to store a plurality of border area dimension data sets each indicating one or more dimensions of the border area,
wherein the image processing circuitry is further configured to:

receive, via the interface circuitry, control data from the source; and
select one of the plurality of border area dimension data sets based on the control data, wherein the border area is rendered based on the selected one of the plurality of border area dimension data sets.

11. The display driver of claim 1, wherein the full frame image has the same resolution as the foveal image and encompasses a larger display area than the foveal image.

12. The display driver of claim 1, wherein the rendering the foveated image comprises rendering the border area by alpha blending respective portions of the upscaled full frame image and the foveal image.

13. The display driver of claim 1, wherein the interface circuitry, the image processing circuitry, and the drive circuitry are monolithically integrated in a single semiconductor chip.

14. A display system, comprising:
a source configured to render a full frame image and a foveal image;
a display panel; and
a display driver configured to:
receive the full frame image and the foveal image from the source;
upscale the full frame image;
render a foveated image from the upscaled full frame image and the foveal image, wherein the foveated image includes:
a foveal area based on the foveal image;
a peripheral area based on the upscaled full frame image; and
a border area based on the foveal image and the upscaled full frame image, the border area being located between the foveal area and the peripheral area; and
drive the display panel using the foveated image.

15. The display system of claim 14, wherein the rendering of the foveated image comprises determining a graylevel of a target pixel in the border area based on a weighted sum of a graylevel of a first pixel in the foveal image and a graylevel of a second pixel in the upscaled full frame image.

16. The display system of claim 15, wherein a weight is assigned to the first pixel in the weighted sum based on a position of the target pixel in the border area.

17. The display system of claim 14, wherein the border area comprises:
a first section that surrounds the foveal area; and
a second section that surrounds the first section,
wherein rendering the foveated image comprises:
determining a graylevel of a first target pixel in the first section based on a first weighted sum of a graylevel of a first pixel in the foveal image and a graylevel of a second pixel in the upscaled full frame image; and
determining a graylevel of a second target pixel in the second section based on a second weighted sum of a graylevel of a third pixel in the foveal image and a graylevel of a fourth pixel in the upscaled full frame image,
wherein a first weight is assigned to the first pixel in the first weighted sum and a second weight is assigned to the third pixel in the second weighted sum, the first weight being larger than the second weight.

18. The display system of claim 14, wherein the source is configured as a separate integrated circuit from the display driver.

19. A method of operating a display driver, comprising:
receiving a full frame image and a foveal image from a source external to the display driver;
upscaling the full frame image; and
rendering a foveated image from the upscaled full frame image and the foveal image, wherein the foveated image comprises:
- a foveal area based on the foveal image;
- a peripheral area based on the upscaled full frame image; and
- a border area based on the foveal image and the upscaled full frame image, the border area being located between the foveal area and the peripheral area; and driving a display panel using the foveated image.

20. The method of claim 19, wherein the rendering of the foveated image comprises determining a graylevel of a target pixel in the border area based on a weighted sum of a graylevel of a first pixel in the foveal image and a graylevel of a second pixel in the upscaled full frame image.

\* \* \* \* \*

UNITED STATES PATENT AND TRADEMARK OFFICE
CERTIFICATE OF CORRECTION

PATENT NO. : 11,748,956 B2  
APPLICATION NO. : 17/500281  
DATED : September 5, 2023  
INVENTOR(S) : Kota Kitamura, Goro Sakamaki and Tomoo Minaki Page 1 of 1

It is certified that error appears in the above-identified patent and that said Letters Patent is hereby corrected as shown below:

In the Specification

In Column 7, Lines 36-38, delete "The foveated image may be a-rendered by merging the foveal image with the upscaled full frame image." and insert -- The foveated image may be rendered by merging the foveal image with the upscaled full frame image. --

Signed and Sealed this  
Sixteenth Day of April, 2024

Katherine Kelly Vidal  
*Director of the United States Patent and Trademark Office*